US012006857B2

(12) United States Patent
Kinnunen et al.

(10) Patent No.: US 12,006,857 B2
(45) Date of Patent: Jun. 11, 2024

(54) METHOD IN A FLOW DEVICE FOR EXHAUST GAS AFTERTREATMENT AND THE FLOW DEVICE

(71) Applicant: Proventia Oy, Oulunsalo (FI)

(72) Inventors: Toni Kinnunen, Oulunsalo (FI); Arno Amberla, Oulunsalo (FI); Jukka Kurikka, Oulunsalo (FI); Tuomas Tyni, Oulunsalo (FI)

(73) Assignee: Proventia Oy, Oulunsalo (FI)

( * ) Notice: Subject to any disclaimer, the term of this patent is extended or adjusted under 35 U.S.C. 154(b) by 57 days.

(21) Appl. No.: 17/858,170

(22) Filed: Jul. 6, 2022

(65) Prior Publication Data

US 2023/0008192 A1    Jan. 12, 2023

(30) Foreign Application Priority Data

Jul. 6, 2021    (FI) .................................... 20215785

(51) Int. Cl.
| | | |
|---|---|---|
| *F01N 3/28* | (2006.01) | |
| *B01D 53/94* | (2006.01) | |
| *B01F 23/213* | (2022.01) | |
| *B01F 25/10* | (2022.01) | |
| *B01F 25/314* | (2022.01) | |
| *F01N 3/20* | (2006.01) | |
| *F01N 5/04* | (2006.01) | |

(52) U.S. Cl.
CPC ....... *F01N 3/2892* (2013.01); *B01D 53/9431* (2013.01); *B01F 23/2132* (2022.01);
(Continued)

(58) Field of Classification Search
CPC ........ F01N 3/2892; F01N 3/2066; F01N 5/04; F01N 2610/1453; B01F 25/3141;
(Continued)

(56) References Cited

U.S. PATENT DOCUMENTS

| | | | |
|---|---|---|---|
| 10,252,225 | B2 | 4/2019 | Tyni et al. |
| 10,486,117 | B2 | 11/2019 | Tyni et al. |

(Continued)

FOREIGN PATENT DOCUMENTS

| | | |
|---|---|---|
| CN | 207686809 U | 8/2018 |
| CN | 109505685 A | 3/2019 |

(Continued)

OTHER PUBLICATIONS

Finnish Patent and Registration Office, Search Report, Application No. 20215785, dated Dec. 22, 2021, 2 pages.

(Continued)

*Primary Examiner* — Kenneth J Hansen
*Assistant Examiner* — Kelsey L Stanek
(74) *Attorney, Agent, or Firm* — Ziegler IP Law Group

(57) ABSTRACT

A method, flow device and system for method of guiding a flow of exhaust gas for aftertreatment, including receiving exhaust gas into a mixing chamber; supporting a mixing tube mostly in the mixing chamber obliquely to and extending through a peripheral wall of the mixing chamber; supporting by a reactant doser mount a reactant doser that doses reactant to the mixing tube; receiving, by a peripheral exhaust gas entry in the mixing tube, exhaust gas at reactant stream arriving from the doser; and forming by a swirl arrangement, a rotating flow around a mixing tube output and enhancing exhaust gas flow through the mixing tube by forming some pressure around the mixing tube downstream from the peripheral exhaust gas entry.

17 Claims, 7 Drawing Sheets

(52) U.S. Cl.
CPC ........ *B01F 25/103* (2022.01); *B01F 25/3141* (2022.01); *B01F 25/31423* (2022.01); *F01N 3/2066* (2013.01); *F01N 5/04* (2013.01); *F01N 2610/1453* (2013.01)

(58) Field of Classification Search
CPC .............. B01F 25/31423; B01F 25/103; B01F 23/2132; B01D 53/9431
USPC .......................................................... 423/545
See application file for complete search history.

(56) References Cited

U.S. PATENT DOCUMENTS

| | | | | |
|---|---|---|---|---|
| 2011/0061374 | A1* | 3/2011 | Noritake | F01N 3/36 60/303 |
| 2014/0033686 | A1* | 2/2014 | Fischer | B01F 25/3141 60/286 |
| 2018/0142597 | A1* | 5/2018 | Riepshoff | F01N 3/2066 |
| 2019/0032535 | A1* | 1/2019 | Gehrlein | F01N 13/08 |
| 2021/0199038 | A1* | 7/2021 | Panunzio | F01N 3/2889 |

FOREIGN PATENT DOCUMENTS

| | | | |
|---|---|---|---|
| CN | 106731932 | B | 3/2020 |
| CN | 107208519 | B | 9/2020 |
| CN | 114076017 | A * | 2/2022 |
| DE | 102018130616 | A1 | 1/2019 |
| WO | 2015116979 | A2 | 8/2015 |

OTHER PUBLICATIONS

European Patent Office, Extended European Search Report, Application No. 22178889.6 dated Nov. 28, 2022, 6 pages.

* cited by examiner

700. receiving exhaust gas into a mixing chamber 701. supporting a mixing tube mostly in the mixing chamber obliquely to and extending through a peripheral wall of the mixing chamber 702. supporting by a reactant doser mount a reactant doser that doses reactant to the mixing tube 703. receiving, by a peripheral exhaust gas entry in the mixing tube, exhaust gas at reactant stream arriving from the doser 704. forming by a swirl arrangement a rotating flow around an output of the mixing tube and enhancing exhaust gas flow through the mixing tube by forming some pressure around the mixing tube downstream from the peripheral exhaust gas entry 705. allowing the exhaust gas to freely flow along a portion of an outer surface of the mixing tube that resides inside the mixing chamber 706. defining in the mixing tube a vestibule by a closed first end of the mixing tube and a flange in the mixing tube, which flange is spaced apart of the first end 707. guiding exhaust gas and reactant flows in the vestibule by an entry guide structure in the vestibule, around and extending from the reactant doser mount deeper into the mixing tube

Fig. 7 Continued

708. guiding the exhaust gas to flow through the mixing tube without a rotation, while guiding the exhaust gas flowing around the mixing tube to rotate at least at an exit of the mixing tube 709. receiving by a turbocharger connector the exhaust gas from a turbocharger to the mixing chamber with some residual swirl from the turbocharger 710. inducing a swirl in the exhaust gas arriving in the mixing chamber by a pre-rotation arrangement 711. conducting the exhaust gas to the flow device or from the flow device to subsequent catalytic or filtration treatment by an intermediate connector pipe 712. insulating the intermediate connector pipe to reduce heat loss 713. insulating the mixing chamber 714. performing after-treatment by at least two reactant mixing devices

METHOD IN A FLOW DEVICE FOR EXHAUST GAS AFTERTREATMENT AND THE FLOW DEVICE

TECHNICAL FIELD

The aspects of the disclosed embodiments generally relate to a method in a flow device for exhaust gas aftertreatment and to the flow device. The disclosure relates particularly, though not exclusively, to reducing pressure loss of reactant mixing with exhaust gas of diesel engines.

BACKGROUND

This section illustrates useful background information without admission of any technique described herein representative of the state of the art.

US 2018142597 A1 discloses a device for introducing a fluid into a gas stream, in which an elbow is formed into an exhaust pipe. Urea liquid is injected via the elbow in the direction of the exhaust pipe through a first intermediate cone structure. The output of the intermediate cone is directed to a second intermediate cone arrangement or protective sleeve. Exhaust gas is directed into both intermediate cone structures. A partitioning is formed such that some of the exhaust gas is directed to a stem part of the first intermediate cone structure. Remainder of the exhaust gas further divided through the second intermediate cone structure and through a gap between the second intermediate cone structure and the exhaust pipe. Swirl structures are also disclosed between the protective sleeve and the exhaust pipe as well as at a gap surrounding a metering tip.

Exhaust gas after-treatment has limited room both in terms of physical space allowed and in terms of counter pressure that may be formed. US 2018142597 A1 requires a length of the exhaust pipe that is roughly 7 times the diameter of the exhaust pipe at the protective sleeve. Moreover, the more turbulence is formed, the better the reactant generally evaporates, but the higher the pressure drop is required. US 2018142597 A1 induces plenty of turbulence and pressure loss on entry of exhaust gas into first intermediate cone in particular, and the gap between the protective sleeve and the exhaust pipe is long and shallow. Sheer number of materials in the mixer of US 2018142597 A1 further adds weight and heating time required before the mixer can efficiently start evaporating liquid urea. Increased counter pressure of exhaust gas may also adversely inhibit emptying of engine cylinders of exhaust gas.

SUMMARY

The appended claims define the scope of protection. Any examples and technical descriptions of apparatuses, products and/or methods in the description and/or drawings not covered by the claims are presented not as embodiments of the present disclosure but as background art or examples useful for understanding the aspects of the disclosed embodiments.

An object of the aspects of the disclosed embodiments is to allow reducing counter pressure of exhaust gas mixing with reactant with compact structures. Another object of the aspects of the disclosed embodiments is to provide a new technical alternative to existing techniques and/or to address any of the known problems of the prior art.

The appended claims define the scope of protection. Any examples and technical descriptions of apparatuses, products and/or methods in the description and/or drawings not covered by the claims are presented not as embodiments of the present disclosure but as background art or examples useful for understanding the aspects of the disclosed embodiments.

According to a first example aspect there is provided a flow device for exhaust gas aftertreatment, comprising a mixing chamber;

a mixing tube that resides mostly in the mixing chamber and is obliquely supported to and extending through a peripheral wall of the mixing chamber;

a reactant doser mount for a reactant doser to dose reactant to the mixing tube;

characterised in that the mixing tube has a peripheral exhaust gas entry configured to receive exhaust gas at reactant stream arriving from the doser, and a mixing tube output;

the flow device has a swirl arrangement around the mixing tube, configured to form a rotating flow around the mixing tube output and to enhance exhaust gas flow through the mixing tube by forming some pressure around the mixing tube downstream from the peripheral exhaust gas entry.

The flow device may be a mixer for mixing reactant with exhaust gas.

Advantageously, by mixing tube being obliquely supported to and extending through the peripheral wall of the mixing chamber, the reactant doser mount can be made suitable for air-free reactant dosers that deliver the reactant without a gaseous carrier. Reactant dosers with pneumatic carrier are notoriously well suited for dosing at any desired point into the exhaust flow, whereas air-free reactant dosers require significantly more space at reactant output. It is particularly advantageous to use an air-free doser in application where pressurised air is not otherwise required for pneumatic breaks, for instance. Tractors, forest machines, and various other machines may particularly benefit of the flow device of the first example aspect, especially though not exclusively where power transfer is performed solely by mechanical, hydraulic, and electric transmission.

The mixing tube may comprise a first end that extends through the peripheral wall of the mixing chamber. The first end may be closed. The closing of the first end may refer to blocking entry and exit of exhaust gas, while reactant may still be dosed through the first end with a doser.

The exhaust gas may be allowed to freely flow along a portion of an outer surface of the mixing tube that resides inside the mixing chamber.

The mixing tube may comprise a vestibule defined by the closed first end and a flange spaced apart of the first end. The mixing tube may comprise a first cylindrical or conical guide attached to the first end. The mixing tube may comprise a second cylindrical or conical guide attached to the flange. The first cylindrical or conical guide may be laterally aligned with the second cylindrical or conical guide. The first cylindrical or conical guide may be spaced apart of the second cylindrical or conical guide such that a gap is formed therebetween. The first cylindrical or conical guide may comprise peripheral apertures for receiving exhaust gas from the vestibule. The second cylindrical or conical guide may be peripherally closed. The gap and the peripheral exhaust gas entry of the mixing tube may be aligned in the flow direction of the reactant.

Advantageously, the flange may direct some of the exhaust gas entering through the peripheral exhaust gas entry to form an escort flow for the output of the reactant doser. The first cylindrical or conical guide may facilitate the forming or guiding of the escort flow. The second cylindrical or conical guide may facilitate the forming or guiding of the escort flow. The second cylindrical or conical guide may facilitate the forming or guiding of the escort flow by partly obstructing flow out of the vestibule onwards along the mixing tube.

Advantageously, the method may provide a convenient escort flow that is relatively insensitive to prevailing flow rate of the exhaust gas.

The exhaust gas entry may comprise one or more apertures in the mixing tube. The exhaust gas entry may comprise one or more apertures in the mixing tube on a side facing towards incoming exhaust gas. The one or more apertures in the mixing tube may reside peripherally in a sector of at most 180 degrees about a longitudinal axis of the mixing tube at the exhaust gas entry.

The mixing tube may comprise one or more peripheral apertures downstream from the peripheral exhaust gas entry of the mixing tube. The mixing tube may comprise one or more peripheral apertures downstream from the flange.

The mixing tube may have an angle or turn dividing the mixing tube into an entry section and an exit section. The exit section may be parallel with a longitudinal axis of the mixing chamber or at least within 5 degrees from the parallel with the longitudinal axis of the mixing chamber. A centreline length of the exit section may be at most 20% or 30% of that of the entry section. The centreline length may be measured along the centreline of the entry or exit section.

The entry section may have a circular cross-section. The entry section may be cylindrical. The entry section may be conical.

The exit section may have a circular cross-section. The exit section may be cylindrical. The exit section may be conical.

The swirl arrangement may be configured to at least locally bridge a gap between an inner wall of the mixing chamber and an outer wall of the mixing tube. The bridging of the gap may refer to closing at least 95% of the distance between the inner wall of the mixing chamber and the outer wall of the mixing tube.

The swirl arrangement may comprise two or more guides extending along at least 180 degrees around the inner wall of the mixing chamber. The two or more guides may extend by at least 50; 75; 95; or 100% in a longitudinal direction of the mixing chamber downstream to a leading edge of the peripheral exhaust gas entry.

The mixing tube may have a round cross-section. The mixing tube may have a circular cross-section. The mixing tube may have an elliptic cross-section.

The mixing chamber may have a round cross-section. The mixing chamber may have a circular cross-section. The mixing chamber may have an elliptic cross-section.

The mixing chamber may have a mixing chamber input and a mixing chamber output at opposite ends of the mixing chamber. The mixing chamber may have a longitudinal axis extending through the mixing chamber input and the mixing chamber output. The mixing chamber may have a longitudinal axis coaxially with the mixing chamber input and the output of the mixing chamber. The exit section may be coaxial with the longitudinal axis of the mixing chamber.

The exhaust gas may be configured to flow through the mixing tube free of rotation, while the exhaust gas flowing around the mixing tube is rotated at least at an exit of the mixing tube. Advantageously, shear forces may be induced into any remaining drops or droplets of reactant arriving from the mixing tube to a rotating edge flow about the end of the mixing tube. The shear forces may help evaporation of liquid reactant and/or accelerate reactions such as hydrolysis and/or thermolysis of the reactant.

The reactant doser mount may be configured to enable mounting the reactant doser in at least two different angles with relation to the longitudinal axis.

According to a second example embodiment there is provided a system comprising the flow device of the first example aspect.

The system may further comprise a turbocharger connector for receiving exhaust gas from a turbocharger and transferring the exhaust gas to the flow device so that the exhaust gas arrives to the mixing chamber with a residual swirl from the turbocharger. The swirl arrangement may be configured to enforce the residual swirl.

The system may comprise a pre-rotation arrangement configured to induce a swirl in the exhaust gas arriving in the mixing chamber. The pre-rotation arrangement may comprise a turbocharger. Additionally, or alternatively, the pre-rotation arrangement may comprise one or more dedicated, optionally static, swirl elements.

The system may comprise a diesel oxidation catalyst, DOC. The system may comprise a diesel particulate filter, DPF. The system may comprise a selective catalytic reduction, SCR, catalyst.

The system may comprise an intermediate connector pipe between an exit of the mixing chamber and subsequent catalytic or filtration treatment.

The intermediate connector pipe may be insulated to reduce heat loss. The mixing chamber may be insulated.

The system may comprise two reactant mixing devices. One or more of the reactant mixing devices may be the flow device of the first example aspect. In downstream direction, a latter reactant mixing device may comprise a pre-swirl arrangement configured to form a swirl in the exhaust gas upstream from the mixing tube.

The latter reactant mixing device may comprise one or more blades partly surrounding a mixing pipe of the latter reactant mixing device and forming a rotating and circulating flow about the mixing pipe. The latter mixing device may guide exhaust gas into the mixing pipe through peripheral apertures and/or an end gap of the mixing pipe. The latter mixing device may be configured to form a rotating and advancing gas flow along the mixing pipe both inside and outside the mixing pipe.

The latter reactant mixing device may be a Proventia SuperTornado™. The latter reactant mixing device may be an apparatus for aftertreatment of exhaust gas comprising an inline housing as disclosed in U.S. Pat. No. 10,486,117 B2.

According to a third example aspect there is provided a method of guiding a flow of exhaust gas for aftertreatment, comprising receiving exhaust gas into a mixing chamber;

supporting a mixing tube mostly in the mixing chamber obliquely to and extending through a peripheral wall of the mixing chamber;

supporting by a reactant doser mount a reactant doser that doses reactant to the mixing tube;

characterised by receiving, by a peripheral exhaust gas entry in the mixing tube, exhaust gas at reactant stream arriving from the doser;

forming by a swirl arrangement, a rotating flow around an output of the mixing tube and enhancing exhaust gas flow through the mixing tube by forming some pressure around the mixing tube downstream from the peripheral exhaust gas entry.

The method may further comprise allowing the exhaust gas to freely flow along a portion of an outer surface of the mixing tube that resides inside the mixing chamber.

The method may further comprise defining in the mixing tube a vestibule by a closed first end of the mixing tube and a flange in the mixing tube, which flange is spaced apart of the first end. The method may further comprise guiding exhaust gas and reactant flows in the vestibule by an entry guide structure in the vestibule, around and extending from the reactant doser mount deeper into the mixing tube.

The method may further comprise guiding the exhaust gas to flow through the mixing tube without a rotation, while guiding the exhaust gas flowing around the mixing tube to rotate at least at an exit of the mixing tube.

The method may further comprise receiving by a turbocharger connector the exhaust gas from a turbocharger to the mixing chamber with some residual swirl from the turbocharger. The swirl arrangement may be configured to enforce the residual swirl.

The method may further comprise inducing a swirl in the exhaust gas arriving in the mixing chamber by a pre-rotation arrangement.

The method may further comprise conducting the exhaust gas to the flow device or from the flow device to subsequent catalytic or filtration treatment by an intermediate connector pipe. The method may further comprise insulating the intermediate connector pipe to reduce heat loss. The method may further comprise insulating the mixing chamber. The intermediate connector pipe may be at least 10 cm long. The intermediate connector pipe may be at least 20 cm long. The intermediate connector pipe may be at least 30 cm long. The intermediate connector pipe may be at least 50 cm long. The intermediate connector pipe may at most 30 cm long. The intermediate connector pipe may at most 100 cm long. The intermediate connector pipe may at most 300 cm long.

The method may further comprise performing after-treatment by at least two reactant mixing devices.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIG. 1b shows a cross-section of the system of FIG. 1a;

FIGS. 2a and 2b show detailed views of a mixer of FIG. 1a;

FIG. 7 shows a flow chart of an exhaust gas after-treatment process of an example embodiment.

DETAILED DESCRIPTION

In the following description, like reference signs denote like elements or steps.

Figure 1A:
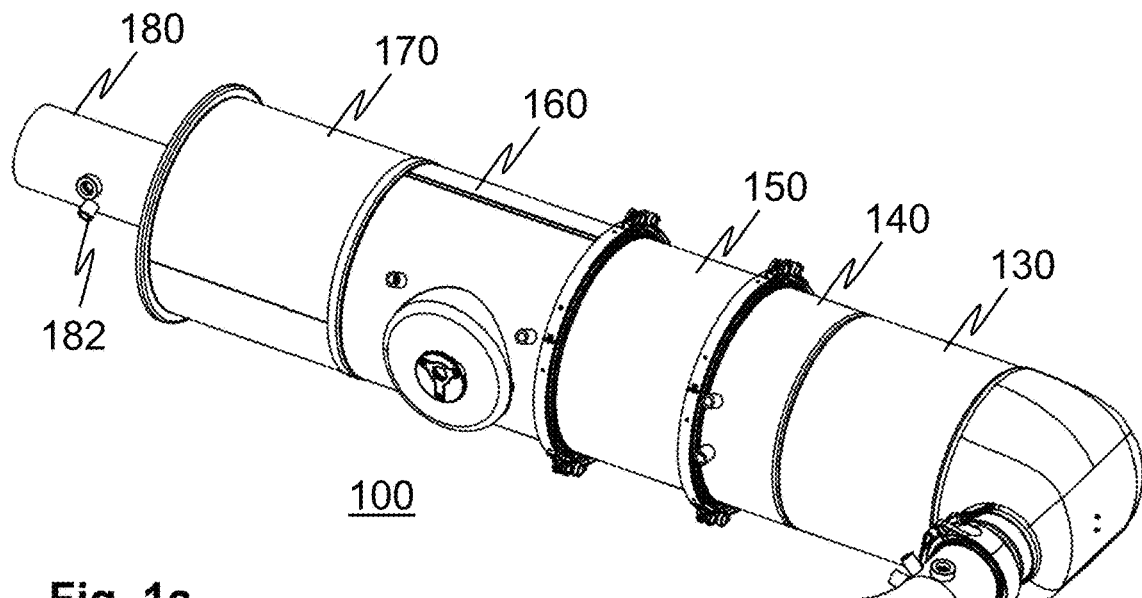
FIG. 1a shows an exhaust gas after-treatment system of an example embodiment.
Figure 1A:
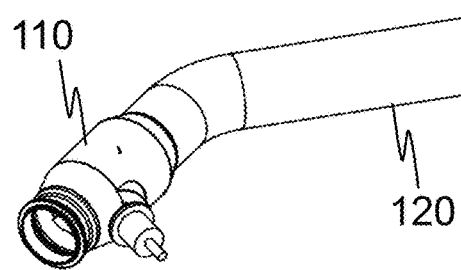

FIG. 1a shows an exhaust gas after-treatment system of an example embodiment, comprising a first mixer 110; an intermediate connector pipe 120; a first selective catalytic reduction, SCR, catalyst 130; a diesel oxidation catalyst, DOC 140; a diesel particulate filter, DPF 150; a second mixer 160; a second SCR 170; an output pipe 180; and a sampling port 182.

Figure 1B:
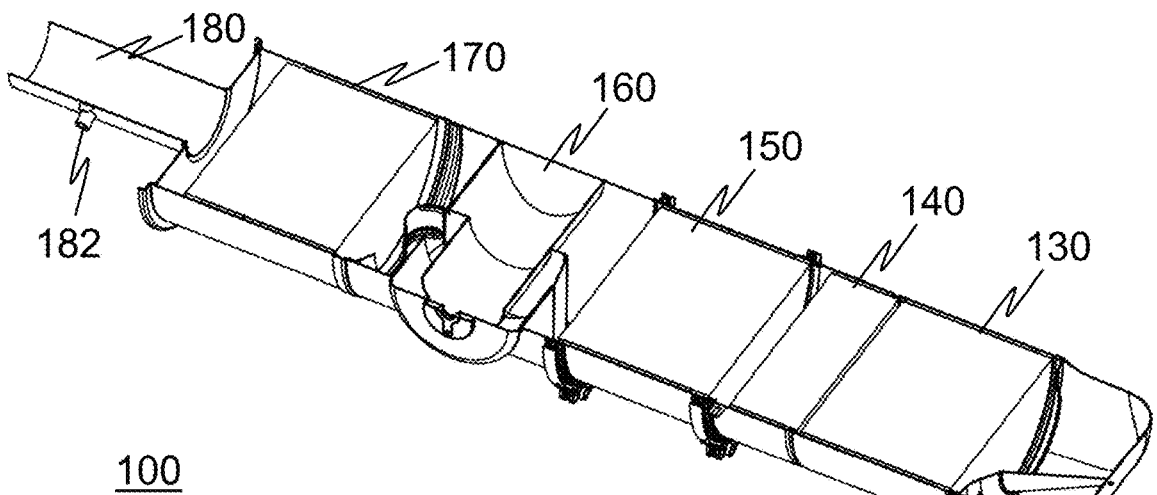
Figure 1B:
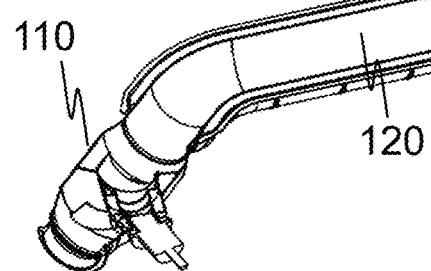

FIG. 1b shows a cross-section of the system of FIG. 1a. In this embodiment, the second mixer 160 has one or more blades partly surrounding a mixing pipe of the latter reactant mixing device and forming a rotating and circulating flow about the mixing pipe. In an example embodiment, the second mixer 160 is configured to guide exhaust gas into the mixing pipe through peripheral apertures and/or an end gap of the mixing pipe. In an example embodiment, the second mixer 160 is configured to form a rotating and advancing gas flow along the mixing pipe both inside and outside the mixing pipe.

The latter reactant mixing device may be a Proventia SuperTornado™. The latter reactant mixing device may be an apparatus for aftertreatment of exhaust gas comprising an inline housing as disclosed in U.S. Pat. No. 10,486,117 B2.

Figure 2A:
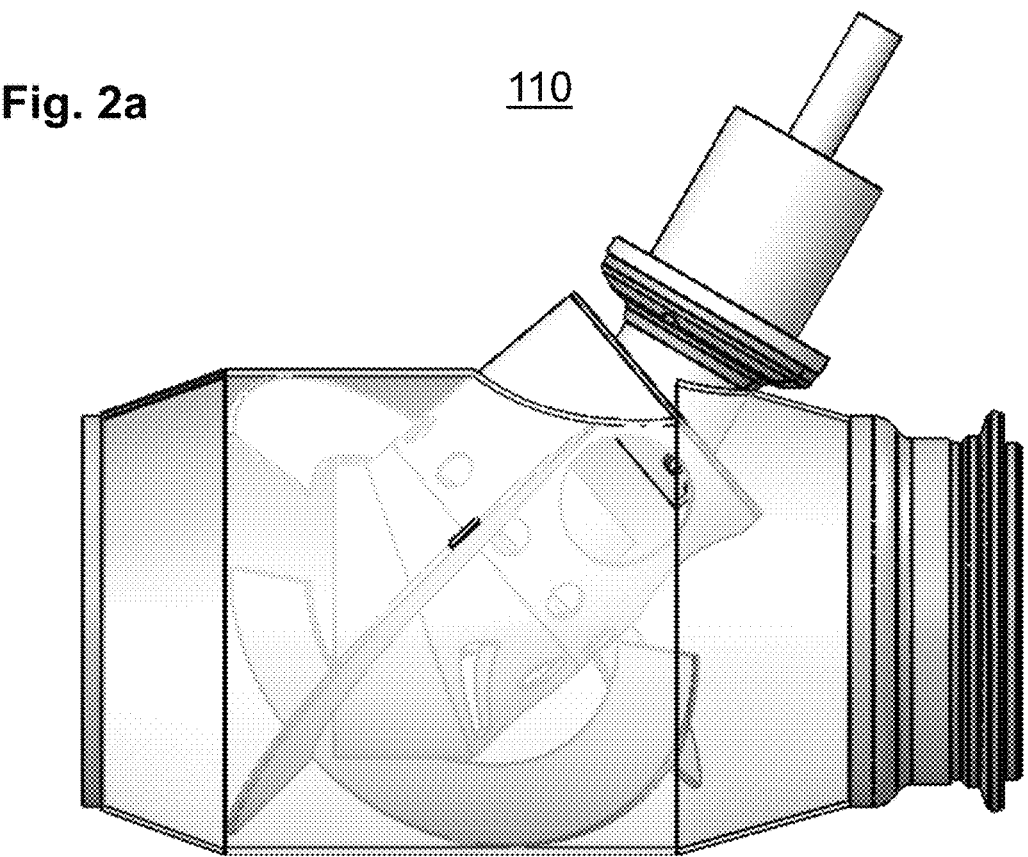
Figure 2B:
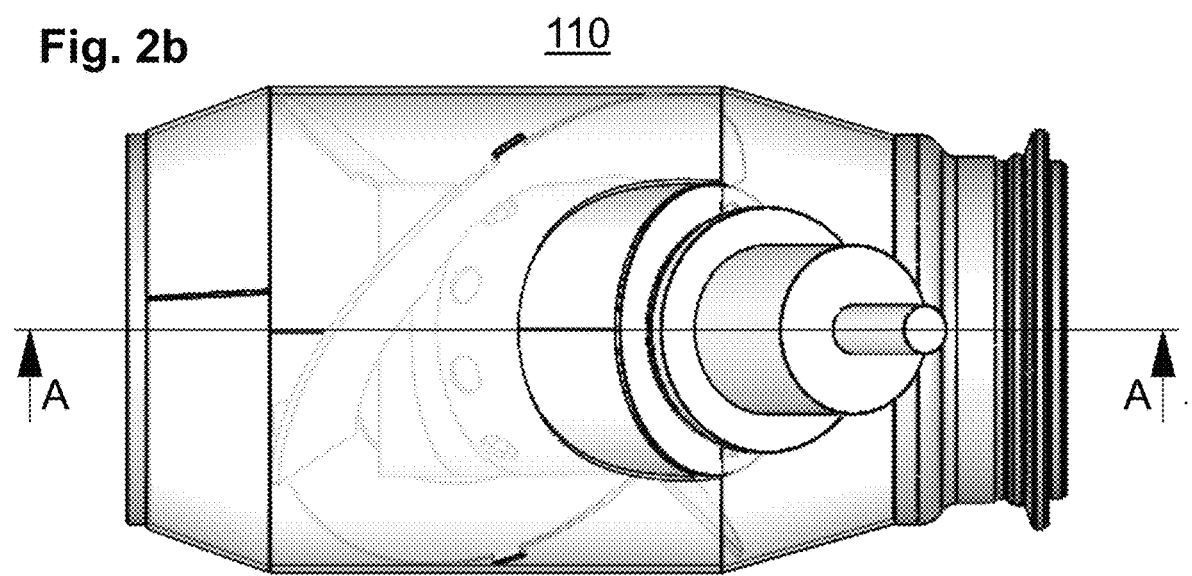

FIGS. 2a and 2b show detailed views of the mixer 110 of FIG. 1a.

Figure 2C:
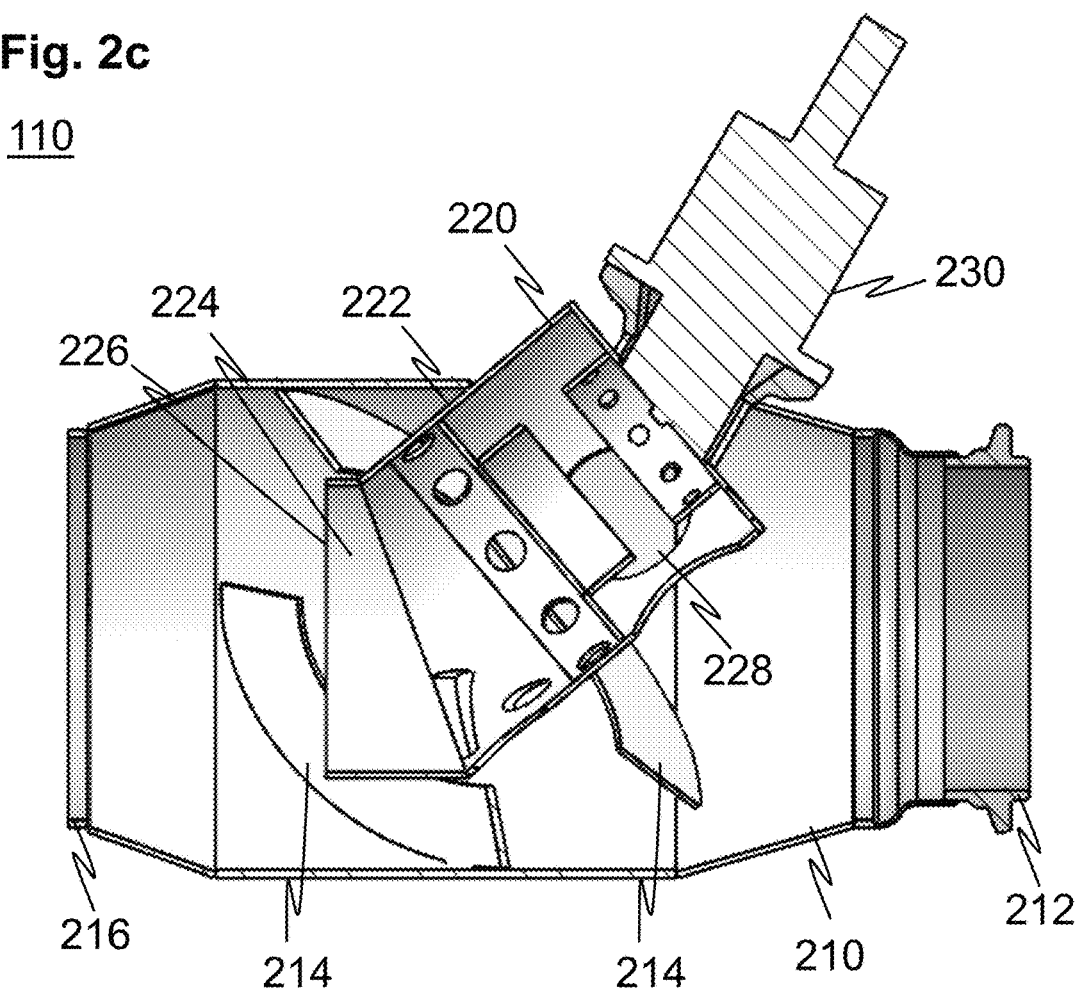
FIG. 2c shows a section view of the mixer of FIGS. 2a and 2b.

FIG. 2c shows a section view of the mixer 110 of FIGS. 2a and 2b (sectioned along line A-A of FIG. 2b). FIG. 2c illustrates a mixing chamber 210 that comprises a mixing chamber input 212; swirl flow guides 214; and a mixing chamber output 216. The mixer 110 further comprises a mixing tube 220 and a doser 230. The mixing tube 220 comprises an entry section 222; an exit section 224; and a mixing tube output 226. The swirl flow guides 214 contribute to forming, collectively with other parts such as inner walls of the mixing chamber and external walls of the mixing tube 220, a swirl arrangement. The swirl arrangement produces a swirl about at least the mixing tube output 226.

Figure 3:
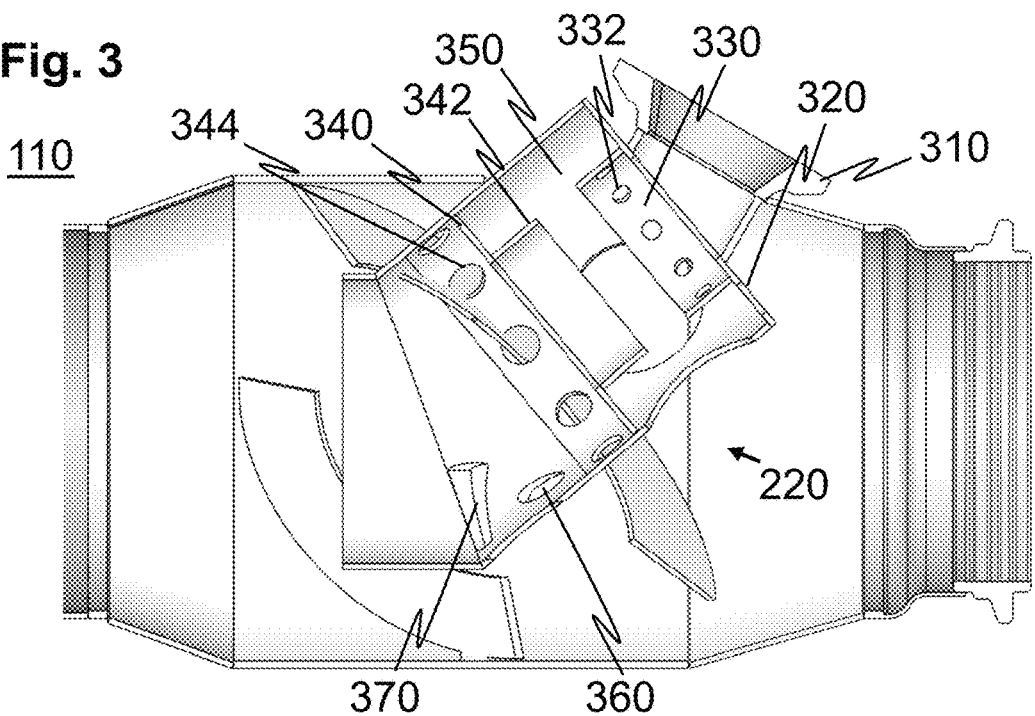
FIG. 3 shows a section view of the mixer of FIGS. 2a and 2b without a doser.

FIG. 3 shows a section view of the mixer 110 of FIGS. 2a and 2b without a doser. FIG. 3 further illustrates a reactant doser mount 310 for mounting the doser 230. The mixing tube 220 has a first end 320 that closes the mixing tube 220 around the doser mount 310. Inside the mixing tube 220, there is a cylindrical or conical guide 330 connected to the first end 320. A flange 340 positioned in the entry section defines a vestibule 350. A second cylindrical or conical guide 242 is attached to the flange, for directing exhaust gas from the vestibule 350 forward along the first section 222 of the mixing tube 220. In FIG. 3, the first cylindrical or conical guide is laterally aligned with the second cylindrical or conical guide 342. The first cylindrical or conical guide 330 is drawn spaced apart of the second cylindrical or conical guide 342 such that a gap is formed therebetween. While in another example embodiment the first cylindrical or conical guide is closed, the one in FIG. 3 has peripheral apertures for receiving exhaust gas from the vestibule. Likewise, or alternatively, the second cylindrical or conical guide 342 may be peripherally closed as in FIG. 3. Alternatively, there may be some apertures in the second cylindrical or conical guide 342.

Further down the first section and/or in the second section, there may be further apertures. FIG. 3 shows a plurality of peripheral apertures 344 downstream after the vestibule 350 and a further aperture 360. An entry opening with integral guide may also be formed as shown with reference sign 370. The integral guide may guide exhaust gas into the mixing tube and/or contribute into forming a swirl about the mixing tube output 226.

Figure 4A:
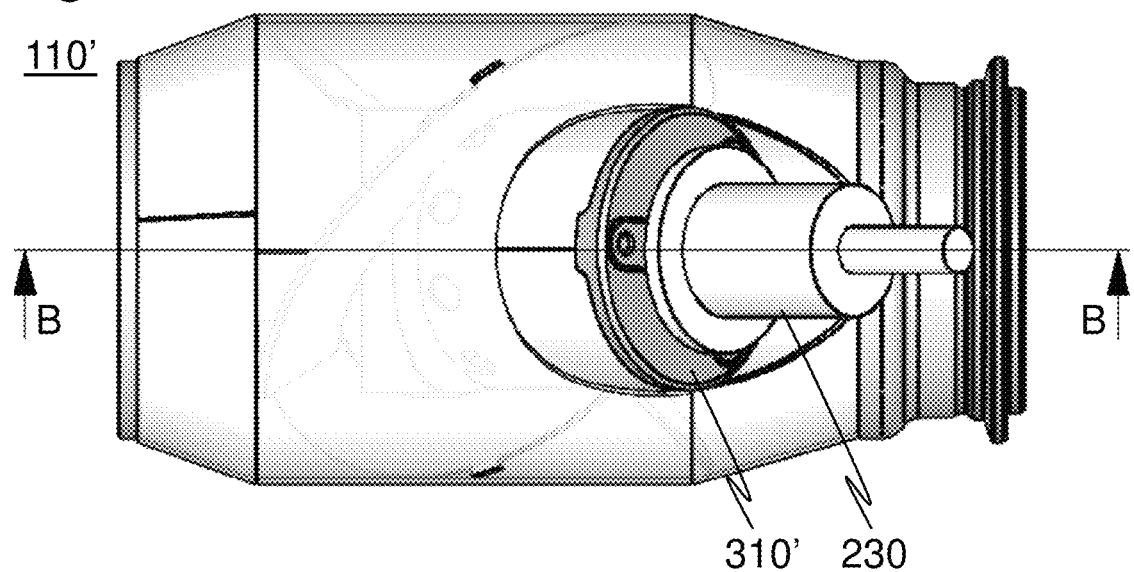
FIGS. 4a and 4b show a mixer of an alternative example embodiment.
Figure 4B:
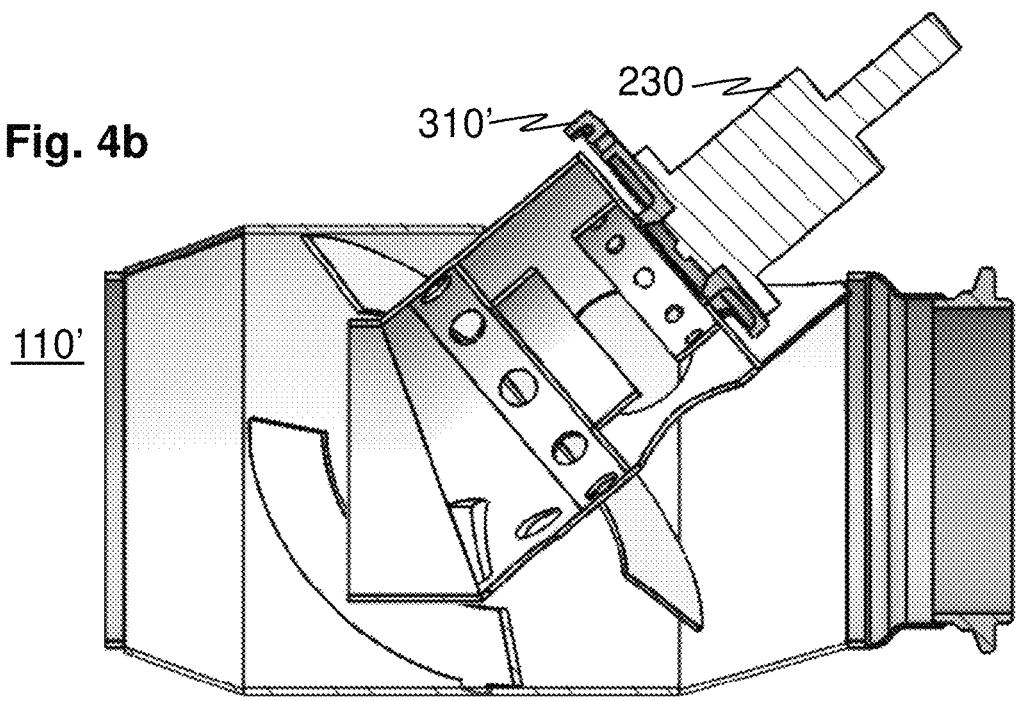

FIGS. 4a and 4b show a mixer 110' of an alternative example embodiment. In this embodiment, the doser 230 is mounted at a different angle. This is implemented by a different reactant doser mount 310' that is not obliquely connected to the first end of the mixing tube. Additionally, here the doser mount 310' is directly connected to the first end without a mounting pipe part.

Figure 5:
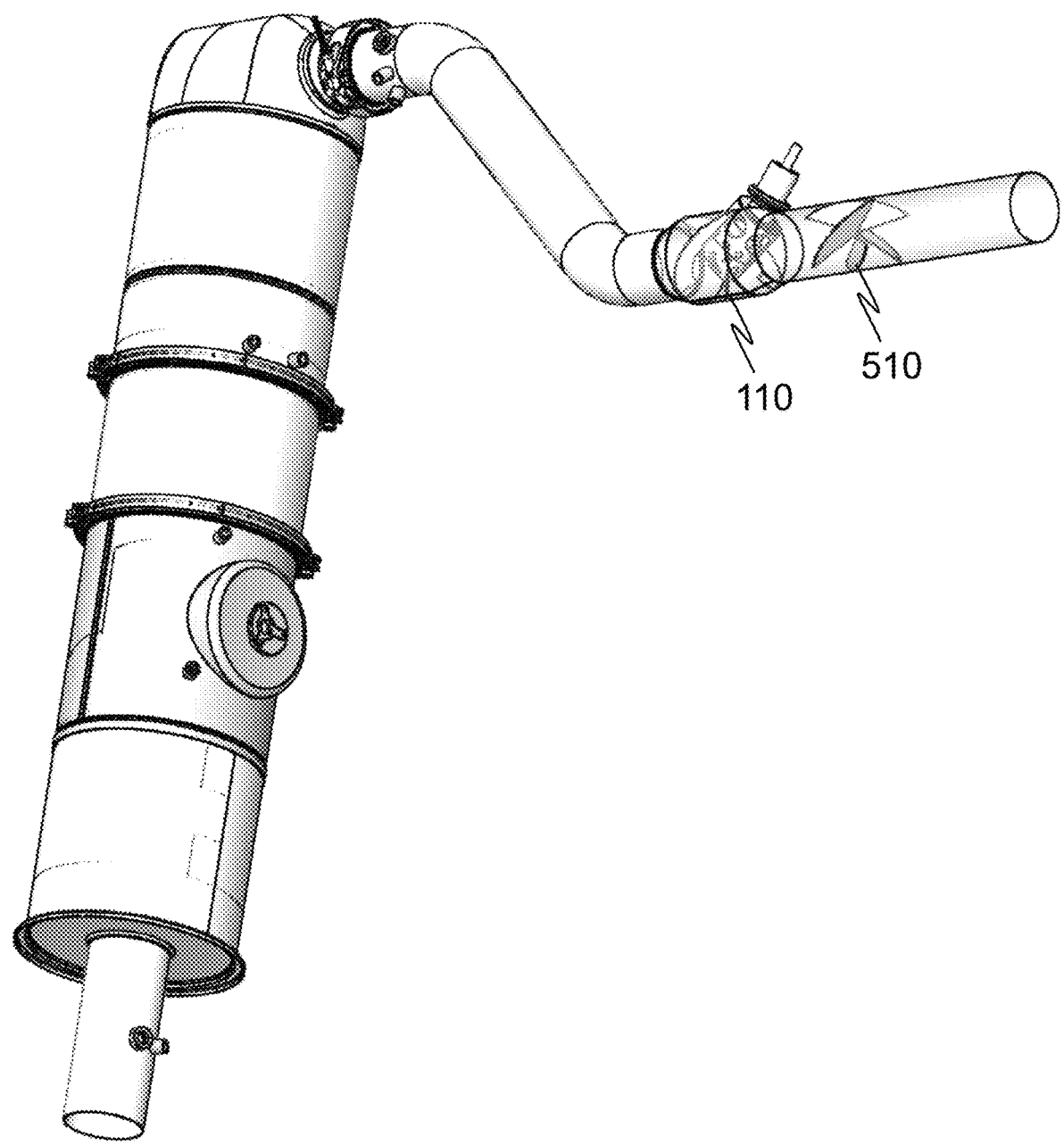
FIG. 5 shows an exhaust gas after-treatment system of an example embodiment.

FIG. 5 shows an exhaust gas after-treatment system 100' of an alternative example embodiment. This embodiment differs from that of FIG. 1 in that there is a pre-swirl arrangement 510 configured to form a swirly upstream from the mixer 110. The system of FIG. 1 is convenient, for example, when mounted downstream a turbocharger such that residual swirl resides in the exhaust gas entering the mixing chamber of the mixer 110.

Figure 6:
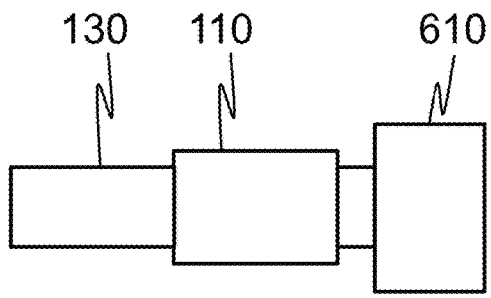
FIG. 6 schematically shows a portion of system of FIG. 1 with a turbocharger.

FIG. 6 schematically shows a portion of system of FIG. 1 with a turbocharger 610. Here, the system has a turbocharger connector, such as the mixing chamber input 212, for receiving exhaust gas from the turbocharger 610 and for transferring the received exhaust gas to the mixer 110 so that the exhaust gas arrives to the mixing chamber with a residual swirl from the turbocharger.

FIG. 7 shows a flow chart of an exhaust gas after-treatment process of an example embodiment. FIG. 7 illustrates a method of guiding a flow of exhaust gas for aftertreatment comprising various possible steps including some optional steps while also further steps can be included and/or some of the steps can be performed more than once:

700. receiving exhaust gas into a mixing chamber;
701. supporting a mixing tube mostly in the mixing chamber obliquely to and extending through a peripheral wall of the mixing chamber;
702. supporting by a reactant doser mount a reactant doser that doses reactant to the mixing tube;
703. receiving, by a peripheral exhaust gas entry in the mixing tube, exhaust gas at reactant stream arriving from the doser;
704. forming by a swirl arrangement, a rotating flow around an output of the mixing tube and enhancing exhaust gas flow through the mixing tube by forming some pressure around the mixing tube downstream from the peripheral exhaust gas entry;
705. allowing the exhaust gas to freely flow along a portion of an outer surface of the mixing tube that resides inside the mixing chamber;
706. defining in the mixing tube a vestibule by a closed first end of the mixing tube and a flange in the mixing tube, which flange is spaced apart of the first end;
707. guiding exhaust gas and reactant flows in the vestibule by an entry guide structure in the vestibule, around and extending from the reactant doser mount deeper into the mixing tube;
708. guiding the exhaust gas to flow through the mixing tube without a rotation, while guiding the exhaust gas flowing around the mixing tube to rotate at least at an exit of the mixing tube;
709. receiving by a turbocharger connector the exhaust gas from a turbocharger to the mixing chamber with some residual swirl from the turbocharger;
710. inducing a swirl in the exhaust gas arriving in the mixing chamber by a pre-rotation arrangement;
711. conducting the exhaust gas to the flow device or from the flow device to subsequent catalytic or filtration treatment by an intermediate connector pipe;
712. insulating the intermediate connector pipe to reduce heat loss;
713. insulating the mixing chamber; and/or
714. performing after-treatment by at least two reactant mixing devices.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the present disclosure. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present disclosure, and not in limitation thereof. Hence, the scope of the present disclosure is only restricted by the appended patent claims.

The invention claimed is:

1. A flow device for exhaust gas aftertreatment, comprising
a mixing chamber;
a mixing tube that resides mostly in the mixing chamber and is obliquely supported to a peripheral wall of the mixing chamber; and
a reactant doser mount for a reactant doser to dose reactant to the mixing tube; wherein
the mixing tube has a peripheral exhaust gas entry configured to receive exhaust gas at reactant stream arriving from the doser, and a mixing tube output; and
a swirl arrangement around the mixing tube, configured to form a rotating flow around the mixing tube output and to enhance exhaust gas flow through the mixing tube by forming some pressure around the mixing tube downstream from the peripheral exhaust gas entry,
wherein the peripheral exhaust gas entry comprises one or more apertures in the mixing tube, the one or more apertures facing towards incoming exhaust gas and residing peripherally in a sector of at most 180 degrees about a longitudinal axis of the mixing tube.

2. The flow device of claim 1, wherein
the mixing tube comprises a first end that extends through the peripheral wall of the mixing chamber; and
the first end is closed.

3. The flow device of claim 2, wherein
the mixing tube comprises a vestibule defined by the closed first end and a flange spaced apart of the first end; and
the peripheral exhaust gas entry resides at least partially at the vestibule.

4. The flow device of claim 3, wherein the mixing tube comprises a second cylindrical or conical guide at the flange.

5. The flow device of claim 4, wherein the second cylindrical or conical guide is peripherally closed.

6. The flow device of claim 2, wherein the mixing tube comprises a first cylindrical or conical guide at the first end.

7. The flow device of claim 6, wherein the mixing tube comprises a vestibule defined by a closed first end of the mixing tube and a flange spaced apart of the first end, and the peripheral exhaust gas entry resides at least partially at the vestibule, and wherein the first cylindrical or conical guide comprises peripheral apertures for receiving exhaust gas from the vestibule.

8. The flow device of claim 1, wherein the mixing tube comprises one or more peripheral apertures downstream from the peripheral exhaust gas entry of the mixing tube.

9. The flow device of claim 1, wherein the mixing tube has an angle or turn dividing the mixing tube into an entry section and an exit section, wherein the exit section is within 5 degrees from parallel with a longitudinal axis of the mixing chamber.

10. The flow device of claim 1, wherein the swirl arrangement comprises two or more guides extending along at least 180 degrees around the inner wall of the mixing chamber.

11. The flow device of claim 1, wherein the two or more guides extend by at least 50% in a longitudinal direction of the mixing chamber downstream to a leading edge of the peripheral exhaust gas entry.

12. The flow device of claim 1, further configured to cause the exhaust gas to flow through the mixing tube free of rotation, while the exhaust gas flowing around the mixing tube is rotated at least at the mixing tube output.

13. A system comprising the flow device of claim 1; and a pre-rotation arrangement configured to induce a swirl in the exhaust gas arriving in the mixing chamber;

the pre-rotation arrangement comprising a turbocharger or one or more dedicated swirl elements.

14. The system of claim 13, wherein the pre-rotation arrangement comprises the turbocharger;

the system is configured to transfer the exhaust gas to the flow device so that the exhaust gas arrives to the mixing chamber with a residual swirl from the turbocharger; and the swirl arrangement is further configured to enforce the residual swirl.

15. A system comprising two reactant mixing devices;

wherein at least one of the reactant mixing devices comprises the flow device of claim 1.

16. The system of claim 15, further comprising a pre-rotation arrangement configured to induce a swirl in the exhaust gas arriving in the mixing chamber, wherein the pre-rotation arrangement comprises a turbocharger or one or more dedicated swirl elements;

the system is configured to transfer the exhaust gas to the flow device so that the exhaust gas arrives to the mixing chamber with a residual swirl from the turbocharger; and the swirl arrangement is further configured to enforce the residual swirl.

17. A method of guiding a flow of exhaust gas for aftertreatment, comprising receiving exhaust gas into a mixing chamber;

supporting a mixing tube mostly in the mixing chamber obliquely to a peripheral wall of the mixing chamber;

supporting by a reactant doser mount a reactant doser that doses reactant to the mixing tube;

receiving, by a peripheral exhaust gas entry in the mixing tube through one or more apertures in the mixing tube, exhaust gas at reactant stream arriving from the doser, the one or more apertures facing forwards incoming exhaust gas and residing peripherally in a sector of at most 180 degrees about a longitudinal axis of the mixing tube; and forming by a swirl arrangement, a rotating flow around a mixing tube output and enhancing exhaust gas flow through the mixing tube by forming some pressure around the mixing tube downstream from the peripheral exhaust gas entry.

* * * * *